W. FREEBORN.
ROTARY PLOW.
No. 191,332. Patented May 29, 1877.
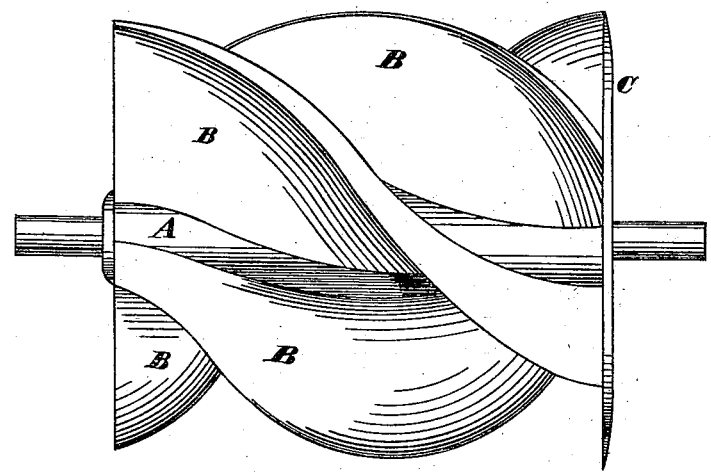
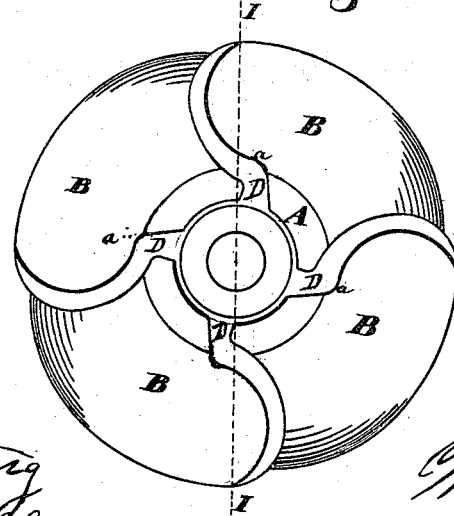
Witnesses
Geo. H. Strong
Jno. L. Doolittle
Inventor
W. Freeborn

UNITED STATES PATENT OFFICE.

WILLIAM FREEBORN, OF SAN FRANCISCO, CALIFORNIA.

IMPROVEMENT IN ROTARY PLOWS.

Specification forming part of Letters Patent No. 191,332, dated May 29, 1877; application filed May 17, 1875.

*To all whom it may concern:*

Be it known that I, WILLIAM FREEBORN, of San Franciso city and county, State of California, have invented an Improved Rotary Plow; and I do hereby declare the following description and accompanying drawings are sufficient to enable any person skilled in the art or science to which it most nearly appertains to make and use my said invention or improvement without further invention or experiment.

My invention relates to an improved cultivator or rotary plow for digging and turning the soil, wherein a series of concavo-convex flanges or mold-boards, arranged spirally around a horizontal shaft in such a manner that when the shaft is rotated the mold-board will cut and turn the soil in furrow-slices, the curve and overhang of the spiral mold-board being so arranged that while rotating they will turn the soil in the same manner that it is turned by an ordinary plow.

My invention consists in the combination of such a plow with a shaft and circular colter, as hereinafter described and claimed.

Referring to the accompanying drawings, Figure 1 is a side elevation of my plow. Fig. 2 is a vertical cross-section.

A is a horizontal shaft or hub, around which I secure spirally two or more concavo-convex flanges or mold-boards, B B, at any desired angle, but, preferably, at an angle of forty-five degrees. Upon the end of the shaft A, which moves against the unplowed land, I secure a circular disk, C, as large in diameter as the circle formed by the edges of the mold-boards. The rim of this disk I sharpen, so that it will serve as a rotary colter to make a straight cut at the inner end of each furrow, and, at the same time, serve the same purpose as the land-side of the ordinary plow, thus counteracting the lateral motion which would be imparted to the machine by the resistance of the soil to the action of the spirally-formed mold-boards.

The mold-boards B B are made concavo-convex, and are arranged spirally around the hub or shaft A, so that as the hub rotates the cutting-edges of the mold-boards will be successively forced into the ground with a drawing or shearing cut, describing, during each revolution, curtate cycloidal curves. The shape and position of the mold-boards on the shaft or hub is such that, while entering and cutting the soil, they describe a curve which presents the least resistance to their action, said shapes and positions coinciding with the relative proportions of the outside diameters and speed of the mold-boards, and of the depth and width of the furrow-slice.

The position of the mold-board on the hub is determined in the following manner: When any point in the length of their cutting-edges is in the ground, a vertical or zero line, I I, drawn through the center of the hub, will leave the inner point $a$ of the curve of the mold-board to the right or left of it, as the cut may be from left to right or from right to left, thus giving an overhang to the mold-board, resembling that of an ordinary plow. This offset D is a straight portion of the blade, connecting the curved portions B with the hub A. The overhang thus produced at the base of the inner face of the mold-board turns the soil in a manner similar to the overhang of an ordinary plow, instead of carrying it around on the revolving mold-board, the resulting action of the curved mold-boards being in effect the same as that of an ordinary plow, cutting successive furrows of the same length diagonally across a strip of ground in width equal to the length of the hub of the rotating mold-boards. This rotary plow can be mounted in any suitably-constructed frame, and can be operated by animal, steam, or other power.

I have not represented the mechanism by which the rotary cultivator is to be operated, because it does not form any part of my invention, and numerous methods and arrangements could be shown, and have been heretofore shown, in connection with other rotary cultivators.

In operating the rotary plow above described, it would be best, in ordinary cases, to commence plowing on the outer edge of a field or body of land, traversing the entire distance around the same, each circuit falling within the previous one until the field is finished at or near the center.

The advantages gained by the use of my rotary plow are, first, economy, as a much greater surface of ground can be plowed in the same time with the same expenditure of power than by the present mode; second, better work, as this manner of plowing avoids sole-friction and leaves the ground under the furrow in the same loose condition it was previously; third, equal twisting and cracking of furrow-slice, and as complete inversion of the same as by the present mode of plowing; fourth, the whole field can be plowed without leaving headlands in any part of them; fifth, this plow can be operated more economically by steam, as the motion of the revolving mold-boards is in the line of direction—consequently the lightest engine consistent with requisite steam capacity can be used; sixth, in consequence of the compact form of this plow, when operated by steam, harrowing and seeding can be done at the same time as the plowing.

Having thus described my invention, what I claim, and desire to secure by Letters Patent, is—

1. The horizontal shaft or hub A, with its circular colter or land-side disk C and spiral mold-boards B B, said spiral mold-boards being continuous, so as to form a rotary plow, substantially as described.

2. The offset D, arranged between and in combination with the spiral concavo-convex mold-board and hub A, as and for the purpose described.

WILLIAM FREEBORN.

Witnesses:
GEO. H. STRONG,
JNO. L. BOONE.